United States Patent
Nathan et al.

(10) Patent No.: US 9,638,174 B2
(45) Date of Patent: May 2, 2017

(54) HYBRID RECEIVER-COMBUSTOR

(71) Applicant: ADELAIDE RESEARCH & INNOVATION PTY LTD, Adelaide, South Australia (AU)

(72) Inventors: Graham J. Nathan, Ironbank (AU); Bassam Dally, Tranmere (AU); Peter Ashman, Walkerville (AU); Aldo Steinfeld, Brugg (CH)

(73) Assignee: ADELAIDE RESEARCH & INNOVATION PTY LTD (AU)

( * ) Notice: Subject to any disclaimer, the term of this patent is extended or adjusted under 35 U.S.C. 154(b) by 0 days.

(21) Appl. No.: 14/388,867

(22) PCT Filed: Mar. 28, 2013

(86) PCT No.: PCT/AU2013/000326
§ 371 (c)(1),
(2) Date: Sep. 29, 2014

(87) PCT Pub. No.: WO2013/142911
PCT Pub. Date: Oct. 3, 2013

(65) Prior Publication Data
US 2015/0054284 A1    Feb. 26, 2015

(30) Foreign Application Priority Data
Mar. 29, 2012  (AU) ................. 2012901258

(51) Int. Cl.
*F03G 6/00*   (2006.01)
*F03G 6/06*   (2006.01)
(Continued)

(52) U.S. Cl.
CPC .............. *F03G 6/06* (2013.01); *F01D 15/10* (2013.01); *F03G 6/00* (2013.01); *F24J 2/04* (2013.01);
(Continued)

(58) Field of Classification Search
CPC .... F03G 6/00; F03G 6/06; F03G 6/065; F24J 2/04; F24J 2/07; F01D 15/10; Y02E 10/41; Y02E 10/46
See application file for complete search history.

(56) References Cited

U.S. PATENT DOCUMENTS 4,312,324 A * 1/1982 Ross ......................... F24J 2/07
                                                126/570
4,602,614 A   7/1986 Percival et al.
(Continued)

FOREIGN PATENT DOCUMENTS

CN     202100342    1/2012
WO   2011068880    6/2011

*Primary Examiner* — Audrey K Bradley
(74) *Attorney, Agent, or Firm* — Renner Kenner Greive Bobak Taylor & Weber

(57) ABSTRACT

A hybrid receiver-combustor (100) for capturing heat energy from a solar source and a fuel source. The hybrid receiver-combustor (100) includes a vessel (110) for acting both as a combustion furnace and as a solar receiver, and a plurality of burners (180) for combusting an oxidant stream, such as an air stream, and a fuel stream. The vessel (110) includes a casing (120) defining a cavity (125) having an aperture (130) for receiving the concentrated solar radiation from the solar source. The cavity (125) provides a chamber defining a zone (126) which can function as a combustion zone for production of heat energy through a combustion process using the fuel and into which concentrated solar radiation can be received from the solar source through the aperture (130). A heat energy absorber (190) configured as a heat exchanger is provided to receive heat energy from concentrated solar radiation entering the cavity (125) through the aperture (130) and from combustion within the cavity. A fluidic seal system (135) is associated with the aperture (130) and is operable to establish a fluidic seal to restrict fluid flow through the aperture (130) during the combustion (Continued)

process. The fluidic seal comprises exhaust gas from the combustion process within the cavity (125).

11 Claims, 11 Drawing Sheets

(51) Int. Cl.
*F24J 2/04* (2006.01)
*F24J 2/07* (2006.01)
*F01D 15/10* (2006.01)

(52) U.S. Cl.
CPC .............. *F24J 2/07* (2013.01); *Y02E 10/41* (2013.01); *Y02E 10/46* (2013.01)

(56) References Cited

U.S. PATENT DOCUMENTS

| | | | | |
|---|---|---|---|---|
| 4,777,934 | A | * | 10/1988 | De Laquil, III ........ F03G 6/064 126/643 |
| 4,913,129 | A | * | 4/1990 | Kelly ......................... F24J 2/07 126/643 |
| 5,586,549 | A | * | 12/1996 | Hartenstine ............ F24J 2/0023 126/612 |
| 5,884,481 | A | | 3/1999 | Johansson et al. |
| 2002/0059798 | A1 | | 5/2002 | Mehos et al. |
| 2012/0216537 | A1 | * | 8/2012 | Fitch .................... C04B 35/573 60/641.12 |

* cited by examiner

HYBRID RECEIVER-COMBUSTOR

FIELD OF THE INVENTION

The present invention relates to a hybrid receiver-combustor for capturing heat energy from a solar source and a fuel source. In particular, the hybrid receiver-combustor is adapted to capture heat energy from a solar source and accommodate combustion to generate heat from a fuel source. The invention has been devised particularly, although not necessarily solely, for use in either power generation or chemical processing. The invention also relates to a method of operating a hybrid receiver-combustor, as well as a system and method for generation of electrical power.

BACKGROUND

The following discussion of the background art is intended to facilitate an understanding of the present invention only. The discussion is not an acknowledgement or admission that any of the material referred to is or was part of the common general knowledge as at the priority date of the application.

Heat is required in many applications including power generation and chemical processing. The sources of heat are diverse but the dominant source is presently fossil fuels that produce significant amounts of carbon dioxide ($CO_2$). This heat is typically collected in boilers, for power generation, or furnaces, for chemical processing. While biomass and waste fuels can partially displace the use of fossil fuels, they are a limited resource and can only substitute a fraction of the need. The leading alternative renewable source of high temperature heat is concentrated solar thermal energy, which is collected in a solar receiver, from mirrors used to concentrate the direct component of solar radiation.

Power generation using concentrating solar thermal technologies remains significantly more expensive than conventional, fossil fuel power. In addition, while solar thermal power allows for thermal storage, it is not cost-effective to provide sufficient storage for periods of extended cloud cover. Despite its advantages, storage also adds to capital cost, which is a further barrier to implementation.

Hybrid solar and combustion systems can avoid the need for thermal storage, which is otherwise required in solar-only systems during periods of low insolation. The state-of-the-art in hybrid systems co-locate solar receivers, which are designed as stand alone systems, with combustors that are designed solely for combustion. Such a system typically results in the solar system cooling down during the night and the combustor being turned down (at least partly) during the day. This results in significant heat losses and inefficiency. It also requires heat exchangers for each energy source, adding to the capital cost of the combined system. The percentage of renewable energy that can be achieved by solar-contribution hybrid systems without storage is also limited.

It is desirable for a hybrid solar and combustion system to be operable continuously for extended periods of time and to also be capable of mitigating against thermal shock arising from rapid variations in the intensity of available solar radiation. A rapid change in solar flux may, for example, be induced by the passage of clouds over a solar concentrator (such as a heliostat field).

There are, however, various problems and difficulties that confront known hybrid solar and combustion systems in relation to operation for extended periods of time and also thermal shock, some of which are outlined in more detail below.

An example of a hybrid solar and combustion system which co-locates the solar receiver and the combustor is disclosed in U.S. Pat. No. 4,602,614 (Percival et al). Specifically, the disclosure concerns a device which includes a receiver cavity, a heat exchanger within the receiver cavity to receive heat from a combustion process within the receiver cavity, and an aperture for admitting solar radiation into the receiver cavity to impinge upon the heat exchanger. The aperture incorporates a window for preventing the escape of combustion gases from the cavity during the combustion process. With this arrangement, the window provides a physical barrier that must be maintained in order for the hybrid solar and combustion system to operate effectively. However, the window is of a configuration which intrudes into the device, thereby limiting the available volume to accommodate the cavity. Moreover, the presence of a window is problematic as it is increasingly vulnerable to damage as the concentration ratio of the concentrated solar radiation is increased. At high fluxes, even small particles can cause damage to the surface of the window and lead to a high risk of failure. Further, it is necessary to maintain the window in a relatively clean condition in order for the system to operate effectively using solar radiation. This can add significantly to operating and maintenance costs. Still further, the use of the window requires that operation of the hybrid solar and combustion system be interrupted to clean the window, thereby preventing continuous, long-term operation of the system using both combustion and solar energy sources.

A further example of a hybrid solar and combustion system which co-locates the solar receiver and the combustor is disclosed in U.S. Pat. No. 5,884,481 (Johansson et al) which provides a device having a receiver chamber, a heat exchanger within the receiver chamber, and an aperture for admitting solar radiation into the receiver chamber to impinge upon the heat exchanger. The device also has facility for a combustion process to produce combustion gases which contact the heat exchanger. In the embodiment described and illustrated in U.S. Pat. No. 5,884,481, an aperture cover is provided for selectively opening and closing the aperture. The embodiment has two operating modes. One mode is a solar operating mode in which the aperture cover is moved away from the aperture to permit solar radiation to insolate the receiver chamber. The other mode is a combustion mode in which the aperture cover is moved into sealing contact with the aperture. With this arrangement, the device can operate only in the solar operating mode or the combustion mode, according to the position of the aperture cover. In another embodiment, which is described but not illustrated, the receiver aperture is covered with a transparent cover, such as a quartz lens, which allows solar energy to enter the receiver chamber but prevents heated fluid from escaping from the receiver chamber. While this arrangement would allow the system to operate in both modes at the same time, it would almost certainly experience the problems referred to above associated with the window in U.S. Pat. No. 4,602,614.

A further problem likely to be encountered with the arrangement disclosed in U.S. Pat. No. 5,884,481, when in the solar operating mode, is that of thermal shock arising from rapid variations in the intensity of available solar radiation. A rapid change in heat-flux can generate high stresses in the heat exchange materials, the management of which can incur significant penalties. By way of example, the use of more exotic, high temperature materials would almost certainly increase costs.

A still further example of a hybrid solar and combustion system which co-locates the solar receiver and the combustor is disclosed in US 2002/0059798 (Mehos et al). Specifically, the disclosure concerns a device which includes a front dome presenting a solar absorber surface which is exposed to solar radiation entering the dome. The device also has a combustion system separate from the front dome. In other words, the device has separate zones for the collection of solar energy and combustion energy. With this arrangement there is no requirement for a window to facilitate entry of solar radiation while inhibiting combustion heat losses. However, because the device has separate zones for the collection of solar energy and combustion energy, it is likely that the device will need to be relatively large and will also be prone to higher heat losses. Furthermore, the device does not have the capacity to mitigate against thermal shock.

It is against this background, and the problems and difficulties associated therewith, that the present invention has been developed.

Accordingly, it is an object of the invention to provide a hybrid receiver-combustor that solves or ameliorates the abovementioned problems, or at least offers a useful choice.

BRIEF DESCRIPTION OF THE INVENTION

According to a first aspect of the invention there is provided a hybrid receiver-combustor for capturing heat energy from a solar source and a fuel source, the hybrid receiver-combustor comprising:

a chamber operable as a combustion zone for production of heat energy through a combustion process using the fuel source;

the chamber having an aperture through which concentrated solar radiation can be received; and a fluidic seal system associated with the aperture, the fluidic seal system being operable to establish a fluidic seal for restricting fluid flow through the aperture during the combustion process.

The fluidic seal need not necessarily completely eliminate fluid flow through the aperture during the combustion process, but need only restrict it sufficiently to maintain an appropriate level of performance of the hybrid receiver-combustor, as would be understood by a person skilled in the art.

Preferably, the fluidic seal comprises exhaust gas from the combustion process within the chamber.

The fluidic seal comprises an exhaust gas curtain.

The hybrid receiver-combustor may further comprise an exhaust gas path for conveying exhaust gas from the combustion process to establish the fluidic seal, wherein the fluidic seal system comprises the exhaust gas path.

The exhaust gas path may be arranged to exchange heat from the chamber to an air stream fed to one or more burners for the combustion process.

Preferably, the hybrid receiver-combustor further comprises a heat energy absorber for receiving heat energy from the concentrated solar radiation and also receiving heat energy from combustion within the chamber. The heat energy absorber in effect captures the energy for subsequent exploitation.

The heat energy absorber may comprise a heat energy absorber medium.

The heat energy absorber may further comprise a heat exchanger associated with the chamber for receiving heat energy from the concentrated solar radiation and also receiving heat energy from combustion within the chamber and transferring the heat received to the heat energy absorber medium.

The heat energy absorber medium may comprise a reacting medium or a non-reacting medium.

In one embodiment, the heat energy absorber medium comprises a heat energy transfer medium.

The heat energy transfer medium may comprise a heat-transfer fluid or a working fluid.

The heat exchanger may be used for direct heating or indirect heating of the working fluid.

The heat-transfer fluid may comprise a gaseous or liquid reacting or non-reacting fluid, and may also comprise a mixture of fluid and solid particles.

The working fluid may be of any appropriate form known to a person skilled in the art, including for example steam for a steam turbine, air for a gas turbine, and CO2 in certain power cycles.

For electrical power generation applications, the heating of the working fluid can be either direct or indirect. In the case of the direct heating of the working fluid, the fluid used to collect the heat is the same fluid as used to drive a turbine. In the case of the working fluid being indirect, heat from the heat transfer medium is transferred to a working fluid which drives a turbine. In the latter case, the heat transfer medium would typically comprise a heat-transfer fluid and the working fluid would be a different fluid.

By way of example only, both the heat transfer medium and the working fluid for direct heating may comprise water for conversion to steam, and the heat transfer medium for indirect heating may comprise molten salts or thermal oils.

In another embodiment, the heat energy absorber may be configured for gasification, endothermic chemical reactions and fuel processing.

Preferably, the heat energy absorber confronts the chamber, whereby the chamber provides a common zone relative to the heat energy absorber for receiving concentrated solar radiation and for production of heat energy through a combustion process. With this arrangement, heat from combustion within the chamber is transferred to the same parts of the heat energy absorber as heat from insolation of the chamber. This is particularly advantageous as it facilitates mitigation of thermal shock arising from rapid variations in the intensity of available solar radiation. In particular, it facilitates compensation for variations in the intensity of available solar radiation through variations in the intensity of the combustion process. In instances where solar radiation is plentiful, the hybrid receiver-combustor may be operated using only heat energy absorber received from concentrated solar radiation. In instances where solar radiation is unavailable (such as at night-time), the hybrid receiver-combustor may be operated using only heat from combustion within the chamber. In other instances, both heat energy from solar radiation and hear energy from combustion within the chamber may be used, with the heat energy from combustion being controllable to manage both thermal output and thermal shock.

Preferably, the heat energy absorber is disposed substantially around the chamber.

Preferably, the heat energy absorber and the aperture cooperate to define the boundary of the chamber.

Preferably, the hybrid receiver-combustor further comprises one or more burners for combusting an oxidant stream and fuel stream, the burner(s) being in fluid communication with the chamber for directing a flame into the chamber, the flame creating the exhaust gas. Typically, there is a plurality of burners.

With this arrangement, there is a flame zone within the chamber and the heat energy absorber is disposed about the flame zone.

When the hybrid receiver-combustor is operating using both energy sources, solar radiation entering the chamber through the aperture can interact with the flame in the flame zone to enhance radiation emitted by the flame.

In one arrangement, the chamber may comprise a front end and a back end, the front end defining the aperture for receiving concentrated solar radiation, the burner being arranged to fire generally toward the back end in approximately the same direction as solar radiation entering the chamber through the aperture.

In another arrangement, the chamber may also comprise the front end incorporating the aperture and the back end, but with the burner arranged to fire generally toward the front end in approximately the opposed direction to that of solar radiation entering the chamber through the aperture.

In yet another arrangement, the chamber may also comprise the front end incorporating the aperture and the back end, but with the burner arranged to fire generally transversely of solar radiation entering the chamber through the aperture to thereby impinge upon the incoming solar radiation.

The hybrid receiver-combustor may further comprise an aperture shutter moveable from an open position to a closed position, wherein the shutter in the closed position provides a physical seal for the aperture so as to reduce heat losses.

Preferably, in heat energy in the chamber is controllable so as to reduce thermal shock-loads that would otherwise be associated with rapid changes in solar radiation. More particularly, heat energy in the chamber is controllable for managing the thermal output and thermal shock-loads.

According to a second aspect of the invention there is provided a hybrid receiver-combustor for capturing heat energy from a solar source and a fuel source and using the captured heat energy to heat a heat-transfer fluid, the hybrid receiver-combustor comprising:

a chamber operable as a combustion zone for production of heat energy through a combustion process using the fuel source;

the chamber having an aperture through which concentrated solar radiation can be received;

a heat-transfer fluid heat exchanger associated with the cavity for receiving heat energy from the concentrated solar radiation and also receiving heat energy from combustion within the thermal zone and a fluidic seal system associated with the aperture, the fluidic seal system being operable to establish a fluidic seal for restricting fluid flow through the aperture during the combustion process.

According to a third aspect of the invention, there is provided a hybrid receiver-combustor for capturing heat energy from a solar source and a fuel source and using the captured heat energy to heat a heat-transfer fluid, the hybrid receiver-combustor comprising:

a vessel useable both as a combustion furnace and as a solar receiver, the vessel including a casing defining a cavity which provided a chamber, the cavity having an aperture for receiving concentrated solar radiation;

a burner for combusting an oxidant stream and fuel stream, the burner in fluid communication with the cavity for directing a flame into the cavity, the flame creating an exhaust gas; and a heat-transfer fluid heat exchanger within the cavity, whereby in use the heat-transfer fluid receives the heat energy from concentrated solar radiation and from the burner in ratios varying from 0:1 to 1:0 and the heat energy is controllable so as to reduce thermal shock-loads that would otherwise be associated with rapid changes in solar radiation; and a fluidic seal system associated with the aperture, the fluidic seal system being operable to establish a fluidic seal for restricting fluid flow through the aperture during the combustion process.

Preferably, the fluidic seal comprises exhaust gas from the combustion furnace.

Preferably, the hybrid receiver-combustor according to the third aspect of the invention further comprises an exhaust path for the exhaust gas, the exhaust gas path arranged to exchange heat from the vessel to the air stream fed to the burner and then exhaust across the aperture so as form the fluidic seal.

According to a fourth aspect of the invention, there is provided a method of operating the hybrid receiver-combustor according to the first, second or third aspect of the invention wherein heat energy in the chamber is controlled so as to manage the thermal output and thermal shock-loads.

According to a fifth aspect of the invention, there is provided a system for generation of electrical power comprising a hybrid receiver-combustor according to the first, second or third aspect of the invention.

Preferably, the system further comprises a steam generator for generation of steam using heat derived from the heat-transfer fluid and an electrical generator operable using energy derived from the steam to generate electricity.

Preferably, system is selectively operable using only heat energy received from concentrated solar radiation, using only heat from combustion within the chamber or both heat energy from solar radiation and heat energy from combustion within the chamber. Typically, the selection of energy source is in response to the availability of solar energy to the chamber.

According to a sixth aspect of the invention, there is provided a method of generating electrical power using a hybrid receiver-combustor according to the first or second aspect of the invention.

Preferably, the method further comprises converting heat energy derived from the heat-transfer fluid into electrical power.

The heat energy derived from the chamber may be converted into electrical power using a conversion system comprising a steam generator for generation of steam using the heat energy derived from the heat-transfer fluid and an electrical generator operable using energy derived from the steam to generate electricity.

The steam generator may rely solely on the heat derived from the heat-transfer fluid.

According to a seventh aspect of the invention, there is provided a method of generating electrical power using a hybrid receiver-combustor configured to be operable based on at least one of a solar source and a fuel source fuel in response to the availability of solar energy from the solar source, the hybrid receiver-combustor having a chamber defining a zone operable as a combustion zone for production of heat energy through a combustion process using the fuel source, the chamber having an aperture for receiving concentrated solar radiation in the zone, the method comprising controlling operation of the hybrid receiver-combustor and further comprising establishing a fluidic seal associated with the aperture during the combustion process to minimise convective losses through the aperture, the fluidic seal being operable to restrict fluid flow through the aperture.

In one mode of operation, the hybrid receiver-combustor may be controlled to use solely the solar source.

In another mode of operation, the hybrid receiver-combustor may be controlled to use solely the fuel source, wherein the fluidic seal is established to minimise convective losses through the aperture.

In yet another mode of operation, the hybrid receiver-combustor may be controlled to use the solar source and the fuel source in combination, wherein the fluidic seal is established to minimise convective losses through the aperture while allowing solar radiation to pass through the aperture.

According to an eighth aspect of the invention, there is provided a system for generation of electrical power comprising a hybrid receiver-combustor for capturing heat energy from a solar source and a fuel source and using the captured heat energy to heat a heat-transfer fluid, and a conversion system for converting heat energy derived from the heat-transfer fluid into electrical power, the conversion system comprising a steam generator for generation of steam using only the heat energy derived from the heat-transfer fluid and an electrical generator operable using energy derived from the steam to generate electricity, wherein the steam generator relies solely on the heat derived from the heat-transfer fluid.

The system for generation of electrical power according to the seventh aspect of the invention may comprise a hybrid receiver-combustor according to the first, second or third aspect of the invention.

According to a ninth aspect of the invention, there is provided a method of controlling a hybrid receiver-combustor configured to be operable based on a solar source and a fuel source fuel in response to the availability of solar energy from the solar source, the method comprising selectively producing heat energy in a chamber using the solar source and the fuel source in combination, and controlling heat energy in the chamber for managing the thermal output and thermal shock-loads.

The method may further comprise selectively producing heat energy in the chamber using only the solar source.

The method may further comprise selectively producing heat energy in the chamber using only the fuel source.

According to a tenth aspect of the invention, there is provided method of generating electrical power comprising controlling a hybrid receiver-combustor configured to be operable based on a solar source and a fuel source fuel in response to the availability of solar energy from the solar source, the hybrid receiver-combustor having a chamber defining a zone, the zone being operable as a combustion zone for production of heat energy through a combustion process using the fuel source, the chamber having an aperture for receiving concentrated solar radiation in the zone, wherein the control of the a hybrid receiver-combustor comprises controlling heat energy in the zone for managing the thermal output and thermal shock-loads. In particular, the heat energy in the zone is controlled so as to reduce thermal shock-loads that would otherwise be associated with rapid changes in solar radiation.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

Figure 1:
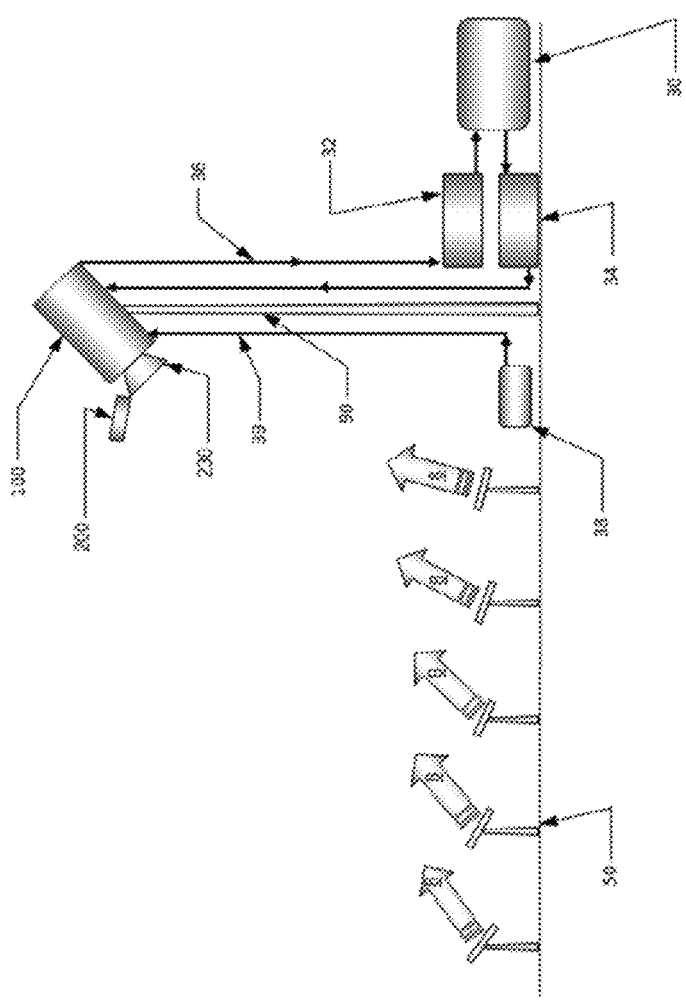
FIG. 1 is a diagrammatic elevational view showing a hybrid receiver-combustor according to the invention mounted on a tower above a heliostat field.

Referring to FIG. 1, a hybrid receiver-combustor 100 mounted to a tower 90 above a heliostat field is shown diagrammatically. The hybrid receiver-combustor 100 is arranged to capture heat energy from a solar source and a fuel source. In the arrangement illustrated in FIG. 1, the solar source, comprises a field of heliostats 50 that reflect sunlight 8 towards the hybrid receiver-combustor 100. A fuel supply system 38 feeding fuel via a fuel supply line 39 to the hybrid receiver-combustor 100 is also shown. Captured heat energy from the fuel source, the solar source, or a combination of the two sources, heat a heat-transfer fluid that is circulated through the hybrid receiver-combustor 100 through thermal fluid lines 36. With the arrangement shown in FIG. 1, the circulated thermal fluid is received by a storage tank 32 and is then fed to an electricity power generating system 30. The cooler fluid then enters a storage tank 34 before being circulated back through the hybrid receiver-combustor 100.

Figure 2:
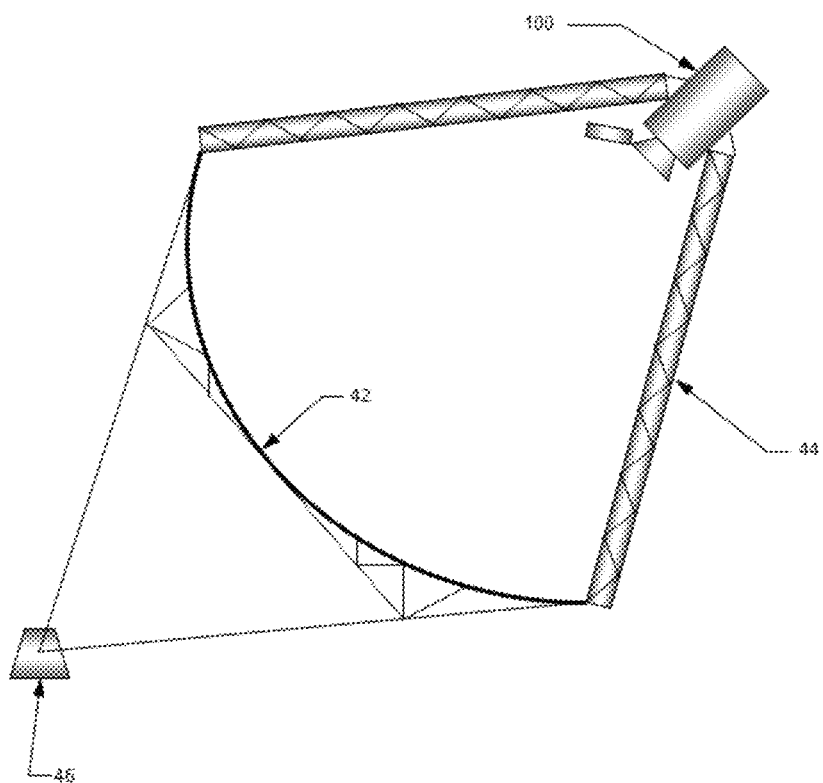
FIG. 2 is a diagrammatic elevational view showing a hybrid receiver-combustor according to the invention mounted on a supporting frame above a parabolic dish.

FIG. 2 shows the same hybrid receiver-combustor 100 as FIG. 1, but mounted on a supporting frame above a parabolic dish instead of mounted on a tower above a heliostat field. With the arrangement of FIG. 2, a parabolic mirror 42 provides a solar source for reflecting solar radiation into the hybrid receiver-combustor 100. A supporting frame 44 supports the hybrid receiver-combustor 100 and the parabolic mirror 42. The supporting frame 44 is pivotally mounted to a base and pivot assembly 46.

Other arrangements, aside from those shown in FIGS. 1 and 2, can be used to provide a solar source to the hybrid receiver-combustor 100. This is explained further below.

Figure 3:
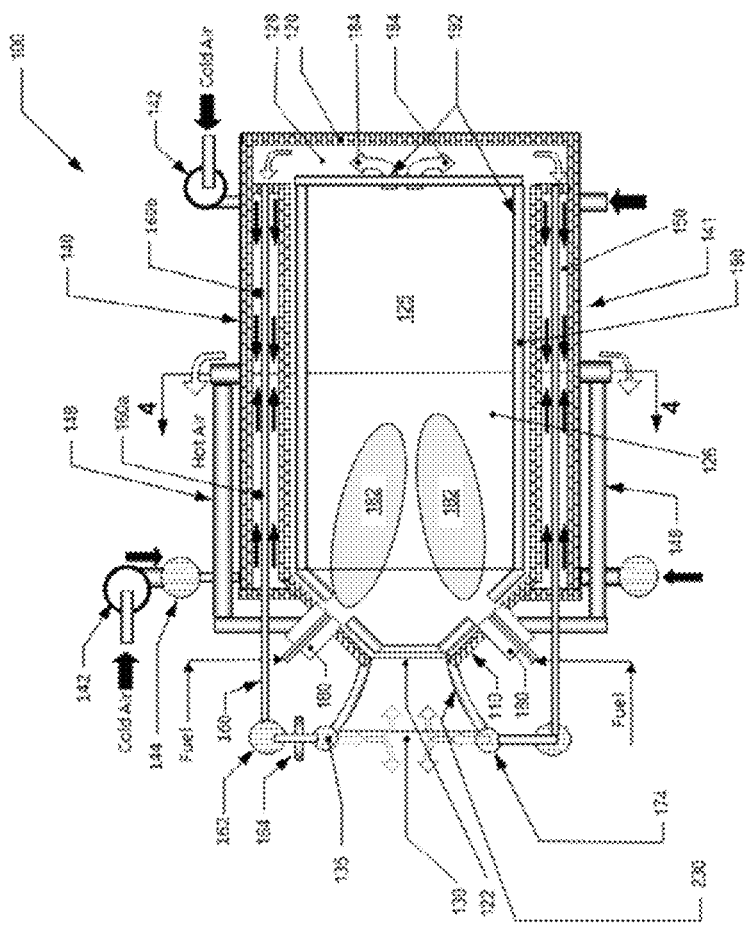
FIG. 3 is a diagrammatic cross-sectional view showing a hybrid receiver-combustor according to a first embodiment of the invention.

FIG. 3 shows a hybrid receiver-combustor 100 according to a first embodiment of the invention in a diagrammatic cross-sectional view. The hybrid receiver-combustor 100 includes a vessel 110 that acts both as a combustion furnace and as a solar receiver, and a plurality of burners 180 for combusting an oxidant stream, such as an air stream, and a fuel stream. The vessel or furnace 110 includes a casing 120 defining a cavity 125 having an aperture 130 for receiving the concentrated solar radiation referred to above. The cavity 125 provides a chamber defining a zone 126 which can function as a combustion zone for production of heat energy through a combustion process using the fuel and into which concentrated solar radiation can be received from the solar source through the aperture 130.

Each burner 180 is arranged in fluid communication with the cavity 125 so as to direct a flame into the cavity 125. The flame 182 creates a flame zone and also generates an exhaust gas 184.

A heat energy absorber 190 configured as a heat exchanger comprising tubes 192 disposed within the cavity 125 through which the heat-transfer fluid passes. In use, the heat-transfer fluid within the heat exchanger 190 receives heat energy from concentrated solar radiation entering the cavity 125 through the aperture 130 and from the burner or burners 180 in ratios varying from 0:1 to 1:0.

The heat energy is controllable so as to allow the heat input to the heat-transfer fluid to be matched to the demand irrespective of gradual or sudden changes to solar insolation. In particular, it allows for rapid changes in input from the fuel to compensate for rapid changes in solar input, and thereby to reduce thermal shock-loads that would otherwise be associated with rapid changes in solar radiation. This can be achieved by controlling the burners 180 and/or by controlling the solar radiation.

A fluidic seal system 135 is associated with the aperture 130 and is operable to establish a fluidic seal to restrict fluid flow through the aperture during the combustion process, as will be explained in more detail later.

Figure 4:
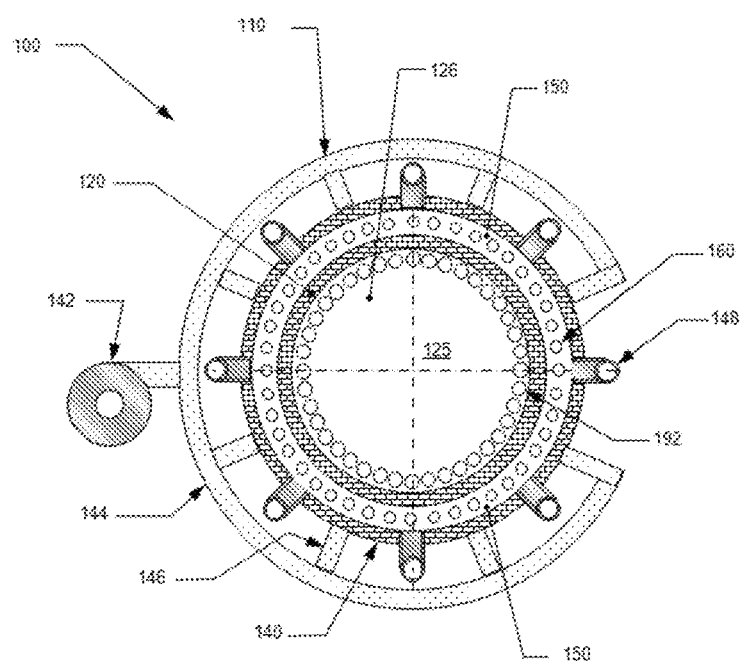
FIG. 4 is a diagrammatic cross-sectional view though section line 4-4 of FIG. 3.
Figure 7:
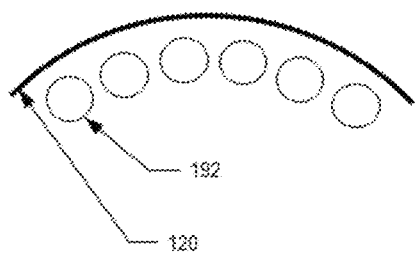
FIGS. 7 and 8 are a diagrammatic partial cross-sectional showing the tubes of the hybrid receiver-combustor of FIG. 3 in two alternative configurations.
Figure 8:
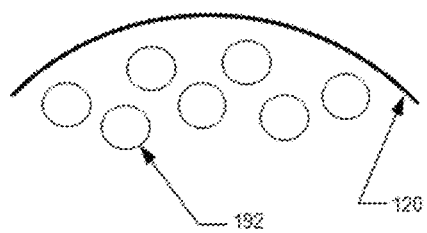

FIG. 4 is a diagrammatic cross-sectional view through sections line 4-4 of FIG. 3. FIG. 4 shows a plurality of heat exchanger tubes 192 for conveying the heat-transfer fluid. Alternative arrangements for the heat exchanger or heat transfer tubes 192 are shown in FIGS. 7 and 8. Other suitable arrangements aside from those illustrated in FIGS. 4, 7 and 8 may also be employed.

Turning again to FIG. 3, it can be seen that the casing 120 includes a front end 122 and a back end 128. The front end 122 defines the aperture 130. In this embodiment, the burner or burners 180 fire generally towards the back end 128 of the casing 120 in approximately the same direction as the solar radiation. The exhaust gases 184 then are drawn by at least one induced draft fan 164 through exhaust gas tubes 160. The exhaust gas tubes 160, are more clearly shown in the cross-sectional view of FIG. 4. They pass through an inlet air cavity 150. As can be seen in FIG. 4, the inlet air cavity 150 is formed between the casing 120 and an air preheat heat exchanger wall 140. This facilitates heating of the air supplied to the burner or burners 180 as is explained below.

Figure 5:
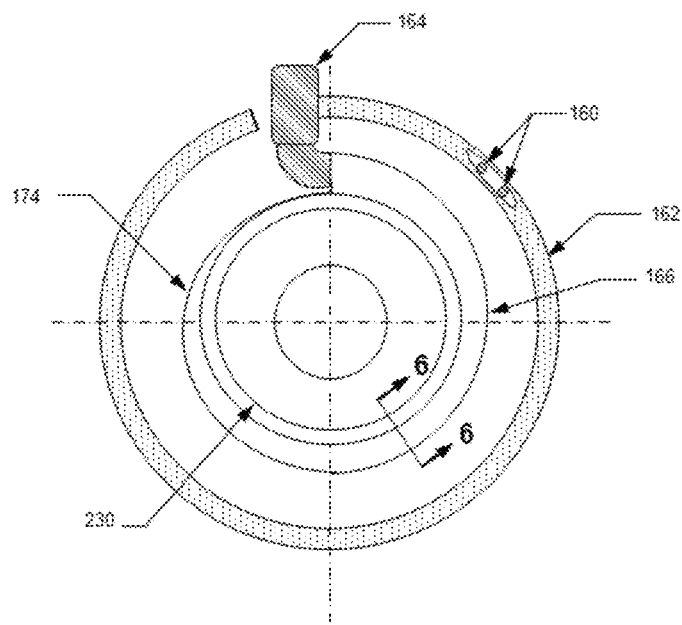
FIG. 5 is a diagrammatic front view of the hybrid receiver-combustor of FIGS. 3 and 4.

After reaching the exhaust gas manifold 162, the induced draft fan 164 directs the exhaust gases into a plenum 166 as is illustrated in FIG. 5. The plenum 166 includes exit ribs 170 and 172 that define an exhaust gas nozzle 168 having a width Wnoz as is shown in the cross-sectional view of FIG. 6.

The exhaust path described above and as illustrated in FIGS. 3, 5 and 6 exhausts across the aperture 130 so as to form a fluidic seal.

With this arrangement, the fluidic seal system 135 comprises the exhaust path described above, including the exhaust gas nozzle 168. Other arrangements, not shown, may be provided to produce a fluidic seal across the aperture 130.

Figure 9:
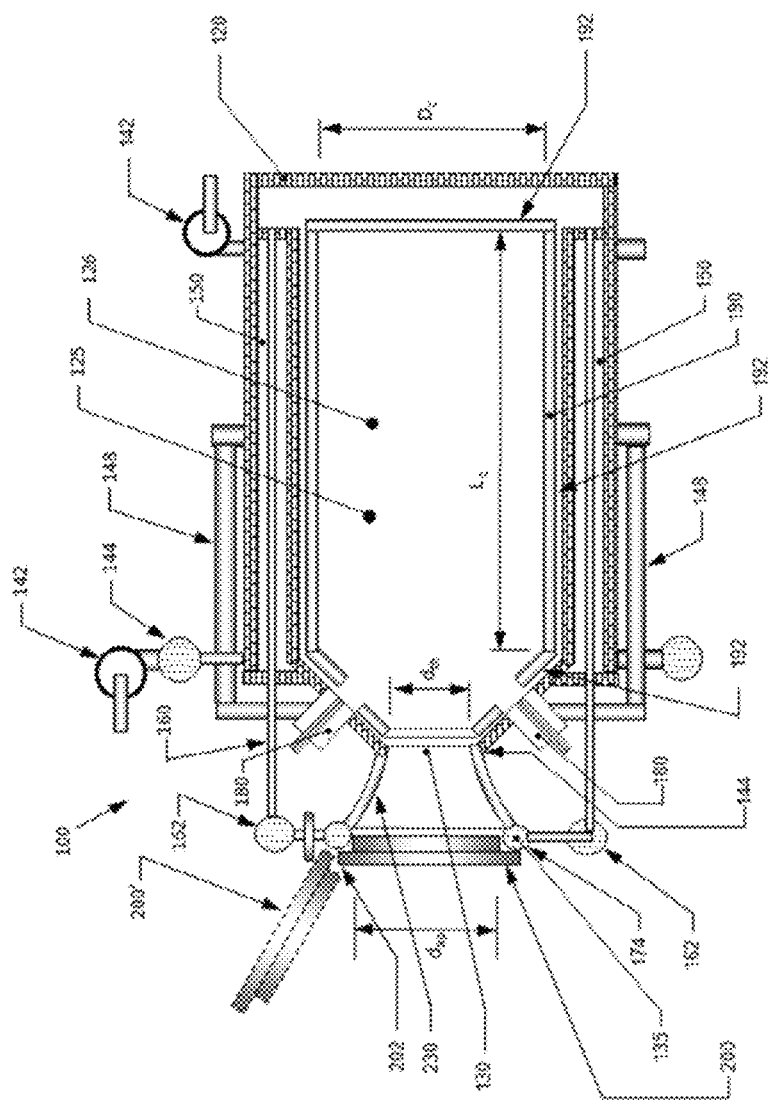
FIG. 9 is a further diagrammatic cross-sectional view showing the hybrid receiver-combustor of FIG. 3.

This embodiment of the hybrid receiver-combustor 100 is also provided with an aperture shutter 200, shown diagrammatically in FIG. 1. The aperture shutter 200 is movable between closed and open positions. In the closed position, the aperture shutter 200 covers the aperture 130, as is shown in FIG. 9, to provide a physical seal to the cavity 125 so as to reduce heat loses. In the open position, the aperture shutter 200 is clear of the aperture 130 to allow entry of solar radiation. The aperture shutter 200 is depicted in the open position in dotted outline in FIG. 9.

In this embodiment, the fluidic seal described above will generally only be used during mixed operation of the hybrid receiver-combustor 100. That is, the fluidic seal will only be used when solar energy is entering the aperture 130 and when there is also combustion in the cavity 125. At other times, for instance when the burners 180 are providing 100% of the heat energy, an aperture shutter 200 may be closed so as to cover the aperture 130 to provide a physical seal to the cavity 125 so as to reduce combustion heat loses.

As described above, an inlet air cavity 150 surrounds the cavity 125 so as to facilitate pre-heating of the inlet air fed to the burner or burners 180. The air at ambient temperature enters through one or more forced draft fans 142 as is shown in FIGS. 3 and 4. The air is then conveyed through an air inlet manifold 144 radially inwards through the air pre-heat heater exchanger wall 140 into the air inlet cavity 150. With the embodiment illustrated in FIGS. 3 and 4, the air is introduced adjacent to both the front end 122 and the back end 128 of the casing 120. The air is then heated as it moves from the ends towards the centre of the furnace and then out through hot air lines 148. In this way, a co-current and a counter-current heat exchange between the air and the exhaust gases is formed. With this arrangement, the co-current heat exchanger section provides the greatest cooling to the hottest part of the exhaust gas tubes 160, tube section 160*b*, at the region where the hot combustion products enter the heat exchanger. The counter-current heat exchanger section provides greatest efficiency at the low temperature end of the exhaust gas stream as it passes through the heat exchanger tube section 160*a*.

The operation of the first embodiment of the invention shown in FIG. 3 will now be described while providing further detail as to the components of the embodiment.

The concentrated solar radiation enters the cavity 125 through the aperture 130. The aperture 130 is advantageously fitted with a compound parabolic concentrator (CPC) 230, which is an optical device used to reduce radiant losses from a cavity receiver, which is heated by either solar heliostat arrays or a parabolic dish concentrator.

The inside of the cavity 125 is lined with tubes 192 to convey the heat-transfer fluid, which can be any gaseous or liquid reacting or non-reacting fluid and can also be a mixture of a fluid and particles. The potential applications include power generation, fuels processing and reforming and endothermic chemical reactions. For electrical power generation, the heating of heat-transfer fluid in the hybrid receiver-combustor can either be direct, in which case the fluid used to collect the heat is the same fluid as used to drive the turbine, or indirect, in which case a different fluid is used to collect (and/or) the heat to that used to drive the turbines. Two common indirect heat-transfer fluids are molten salts and thermal oils, while a common direct fluid is steam, but this list is illustrative only. Non-power generating applications include gasification, in which the heat-transfer fluid will primarily comprise stream and suspended carbonaceous particles, although any variation of this to facilitate effective gasification processes could also be used.

In the arrangement illustrated in FIG. 1, the heat-transfer fluid is heated directly and comprises water which is converted to steam to operate the electricity power generating system 30 in known manner.

The tubes 192 can be configured in a range of alternative ways or shaped with alternative profiles to allow the heat flux to be matched during operation with the two heat sources—the concentrated solar radiation and the flame(s). The annular and staggered configurations are shown by way of example in FIGS. 7 and 8, but it will be evident to one skilled in the art that alternative configurations can also be used to balance the heat flux. FIGS. 7 and 8 also show small gaps between the tubes 192, which are needed to allow both for thermal expansion and for convective heat transfer to the tubes during the combustion mode. Fins, dimples and other aerodynamic devices can also be used to augment the convective component of heat transfer to the heat-transfer fluid.

A number of burners 180 are introduced from either end of the cavity 125. In the configuration shown in FIG. 3, the burners 180 are arranged close to the aperture 130, to fire generally toward the back end 128 of the cavity 125, in approximately the same direction as the incoming solar radiation.

The use of multiple burners 180 also allows the heat transfer to the top of the cavity 125 to be balanced relative to that at the bottom owing to the influence of buoyancy. Furthermore, the arrangement of the flow between the heat transfer tubes 192 can be designed to help to balance any variations in heat transfer between the top and the bottom of the cavity 125 due to the influence of buoyancy.

Referring to FIG. 3, it can be seen that the induced draft fan 164 is placed downstream of the air-pre-heater 141, where the exhaust gas stream has been cooled. This is used to reduce the pressure in the cavity 125 and so to induce combustion gases to leave the cavity 125 through the air-pre-heater 141 and also to provide the motive force for the jet of exhaust gases across the aperture 130. In combination with the forced draft fans 142, which blow the cold air through the air pre-heater 141, the pressure in the cavity 125 can be controlled to be very close to atmospheric, thereby minimising ingress or egress of combustion gases out from, or cold air in through, the aperture 130.

The hot combustion products from the flame(s) 182 diffuse through the gaps in the receiver tubes 192 to leave the cavity 125 at the opposite end of the chamber to the aperture and then enter the air pre-heater 141, which is arranged in a co-annular configuration around the cavity 125. This recovers heat from the hot combustion products to thereby also pre-heat the combustion air.

The air pre-heating heat exchanger 141 is arranged so that the cold air enters at either end of the heat exchanger and leaves near to the middle. That is, it provides both a co-current and counter-current device. The co-current heat exchanger provides the greatest cooling to the hottest part of the tubes at the region where the hot combustion products enter the heat exchanger. The counter-current heat exchanger provides greatest efficiency at the low temperature end of the exhaust gas stream.

The cooled exhaust products leave the heat exchanger 141 in close proximity to the aperture 130 of the cavity 125 to allow some of the exhaust products to be advantageously directed over the aperture 130 as a curtain of jets, comprising flue gases. The jets can be directed across the aperture 130 from a range of potential locations around the aperture 130, with the two desirable alternatives shown in FIGS. 3 and 4. However, these are by way of example, with any plane through the CPC 230 being possible. The purpose of these jets is to minimise convective losses through the aperture 130—either from hot gases escaping outward or cold air being induced into the cavity 125. The capacity to prevent ambient air from being induced into the cavity 125 is also necessary to control the combustion stoichiometry. The exhaust products may alternatively be used to provide flue gas recirculation (also known as "exhaust gas recirculation") for NOx control. At the same time, it is advantageous to minimise both the amount and the optical path length through the exhaust curtain, since flue gases contain both $CO_2$ and water vapour, which are spectrally absorbing gases, and because the density gradients in the aperture will introduce some beam steering, which will reduce the concentration ratio of the solar radiation during mixed operation, in which both concentrated solar radiation and a flame are used at the same time. Nevertheless, the exhaust curtain will only be needed during these periods of mixed operation.

The mixed mode of operation will be usefully employed during periods of reduced solar insolation, but when it is sufficient to provide a useful contribution to the hybrid receiver-combustor. Under such circumstances, the mixed mode of operation offers several advantages over stand-alone solar operation. It allows the heat flux to the tubes to be controlled independently of intermittent variation of solar radiation, which has potential to greatly reduce or avoid the thermal shock-loads associated with rapid changes in solar flux. It also allows concentrated radiation to be harvested at low fluxes than is possible for stand-alone operation.

Referring to FIG. 9, key dimensions are shown. The length of the cavity, Lc, relative to the diameter, Dc, can be effective over a wide range but is typically in the range $1<Lc/Dc<10$ and is most efficient in the range $2.5<Lc/Dc<5$.

The diameter of the aperture throat dth to that of the cavity Dc, can operate effectively over the range $1<dth/Dc<10$ but typically operates most efficiently in the range $2<dth/Dc<5$.

Figure 6:
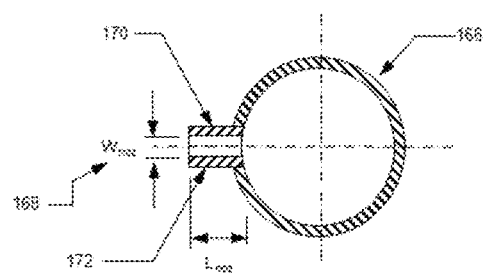
FIG. 6 is a diagrammatic cross-sectional view though section line 6-6 of FIG. 5.

The fluidic seal system 135 for delivering the exhaust curtain to provide the fluidic seal in this embodiment is shown in more detail in FIGS. 5 and 6. The cooled exhaust from the heat exchanger 141 is collected through the exhaust gas manifold 162 and delivered via a fan 164 into an annular exhaust curtain generator. The exhaust curtain generator comprises an annular plenum 166 and a nozzle 168. The cross section of the plenum (on section line 6-6) can be advantageously tapered in a volute to provide approximately constant flow-rate around the annulus (as shown in FIG. 5), but can also be constant around the annulus. The width of the nozzle, Wnoz, is typically constant around the annulus, except for ribs 170, 172 to provide structural integrity, but can alternatively be varied progressively to compensate for variations in the pressure field around the plenum 166. The device will generate an exhaust curtain for almost any width of the nozzle, Wnoz, but is typically in the range $2<Wnoz/dap<200$ and is advantageously in the range $5<Wnoz/dap<50$.

The aperture shutter 200, shown in FIG. 9, can be effective for wide range of shapes, but is advantageously circular to match the circular shape of the aperture 130. It is movable, typically by a hinge 202, so that it can be moved into the closed position to seal the chamber when the solar insulation is too low to provide a positive input to the device and moved into the open position to avoid any blockage to the concentrated radiation when the solar radiation is introduced into the cavity 125. The shutter 200 is advantageously cooled by a heat transfer fluid (e.g. water), both to protect the shutter 200 and to provide a useful input to heat collection by the heat-transfer fluid.

The CPC 230 is also advantageously cooled by the heat-transfer fluid.

Introducing recirculated exhaust gas into the cavity 125, if performed optimally, may also enhance heat transfer from combustion because it will increase the convective heat transfer coefficient by increasing the flow rate of gases and will also increase the gas-phase emissivity due to the higher concentration of $CO_2$ and $H_2O$ in the mixture, which will increase this aspect of radiation heat transfer. However, it will also reduce heat transfer by reducing flame temperature and may also reduce the emissivity by reducing amount of soot. The design provides flexibility to optimise how the flue gases are introduced with a view to maximising total heat transfer.

During periods when the device is heated entirely by the flame(s) 182, the shutter 200 will be placed over the aperture 130 to provide a physical seal and to avoid radiation heat losses. This device can advantageously also be cooled with heat transfer fluid to collect useful heat and control its temperature.

During the "solar-only" mode of operation, the hybrid receiver combustor 100 is heated entirely by concentrated solar radiation. In this mode, no gases are conveyed through the cavity 125, except as may be required for cooling purposes. This mode will apply when the solar flux is sufficiently high to operate the hybrid receiver-combustor 100 by itself.

Figure 10:
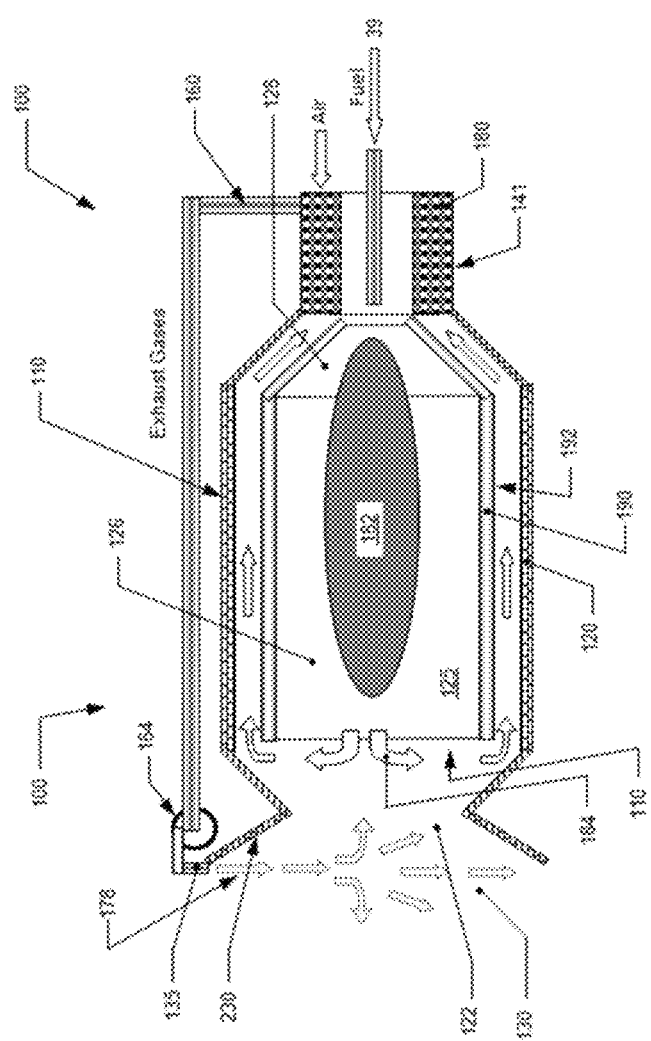
FIG. 10 is a diagrammatic cross-sectional view showing a hybrid receiver-combustor according to a second embodiment of the invention.

A second embodiment of the invention is shown in FIG. 10. The second embodiment is similar in some respects to the first embodiment and corresponding reference numerals are used to identify corresponding parts.

In particular, FIG. 10 shows the second embodiment of the hybrid receiver-combustor 100 according to the invention in a diagrammatic sectional view. The second embodiment of the hybrid receiver-combustor 100 includes a furnace 110 and a burner 180 for combusting an oxidant stream, such as an air stream, and a fuel stream. The furnace 110 includes a casing 120 defining a cavity 125 having aperture 130 for receiving the concentrated solar radiation shown in FIGS. 1 and/or 2 for instance.

The burner 180 is arranged in fluid communication with the cavity 125 so as to direct a flame 182 into the cavity 125. The flame 182 creates an exhaust gas 184.

A heat energy absorber 190 configured as a heat exchanger including heat-transfer fluid tubes 192 is disposed of in the cavity 125. In use, the heat-transfer fluid within the heat exchanger receives heat energy from concentrated solar radiation and from the burner 180 in ratios varying from 0:1 to 1:0. The heat energy is controllable so as to maintain thermal output independent of a variable solar input and to reduce thermal shock-loads that would otherwise be associated with rapid changes in solar radiation.

The casing 120 includes a front end 122 and a back end 128. The burner 180 fires generally towards the front end 128 as a casing 120 in approximately the opposite direction as the solar radiation. The exhaust gases 184 are then drawn by at least one induced draft fan 164 through an exhaust gas tube 160. An air preheat exchanger 141 is arranged to transfer heat from the exhaust gases 184 to air supply to the burner 180.

On the downstream side of the induced draft fan 164 an exhaust gas curtain generator (not shown) induces a fluidic seal or exhaust gas curtain 178. Various exhaust gas generating systems can be employed as the fluidic seal system 135; for instance, the exhaust gas manifold 162 described with reference to the first embodiment of the invention and illustrated in FIGS. 5 and 6 may also be used for the second embodiment of the invention illustrated in FIG. 10.

The operation of the second embodiment of the invention shown in FIG. 10 will now be described while providing further, detail as to the components of the embodiment.

The concentrated solar radiation enters the cavity 125 through the aperture 130. The aperture 130 is advantageously fitted with a concentrating parabolic concentrator (CPC) 230.

The inside of the cavity 125 is lined with tubes to convey the heat-transfer fluid, which is to be heated. The heat-transfer fluid can be any gaseous or liquid fluid, such as molten salt or steam, in the case of power generation applications. Non-power generating applications include a mixture of stream and carbonaceous particles to be heated for the purpose of gasification, but this list is not intended to be exhaustive. Small gaps are required between the tubes 192 to allow for thermal expansion.

A ring of burners 180 are introduced from the opposite end of the chamber to the aperture, to fire toward the aperture, in the opposite general direction to the incoming solar radiation (in the diagrammatic view of FIG. 10 only one burners is shown. While this may be suitable is some applications, for many applications multiple burners 180 will be provided.

The hot combustion products from the flame 182 are induced to reverse in direction and undergo a second pass along the back of the tubes 192 to provide convective heat transfer by the induced-draft fan 164, similarly to the co-flow configuration of FIG. 3. The combination of forced and induced draft fans are used to balance the pressure in the cavity 125 in a manner similar to that described for the first embodiment shown in FIG. 3.

A heat exchanger 141 is provided to recover heat from the combustion products by pre-heating the combustion air.

The cooled exhaust can be delivered to the aperture 130 of the cavity 125 to allow some of the exhaust products to be advantageously directed over the aperture 130 as a curtain, or jets, of flue gases. The jets can be directed across the aperture 130 from two sides (as shown in FIG. 1), from all around, or from one side (as shown in FIGS. 5 and 6). This will inhibit the entry of cold air through the aperture 130, while also allowing the concentrated radiation to enter. The exhaust products may also be used to provide flue gas recirculation for NOx control. The exhaust curtain will only be needed during periods of mixed operation, in which both concentrated solar radiation and a flame 182 are used at the same time. The amount and distribution of the exhaust gases can vary. Sufficient exhaust will be typically be used to avoid induction of cold air into the cavity 125, while minimising the path length of the concentrated solar radiation through the flue gases, which are spectrally absorbing.

During periods when the hybrid receiver-combustor 100 is heated entirely by the flame, a shutter 200 will be placed over the aperture 130 to provide a physical seal and to avoid radiation heat losses. This device can advantageously also be cooled with heat transfer fluid to collect useful heat and control its temperature.

During periods when the hybrid receiver-combustor 100 is heated entirely by concentrated solar radiation, no gases are conveyed through the cavity 125, except as may be required for cooling purposes. This mode will apply when the solar flux is sufficiently high to operate the hybrid receiver-combustor 100 by itself;

Again, with this embodiment of the invention, mixed mode of operation is possible, with simultaneous use of concentrated solar and combustion provides a wide range of advantages as previously described.

The co-flowing embodiment of FIG. 3 and counter-flowing configuration of FIG. 10 each offer some advantages and disadvantages. These two embodiments are provided by way of illustration, and, small variations to the configurations shown and described are not precluded from the invention.

The anticipated advantages of the co-flowing embodiment, shown in FIG. 3, over the counter-flow embodiment shown in FIG. 10, are as follow:

The convective losses through the aperture are expected to be lower because the gases do not need to do a flow reversal without a wall.

The flue gases leave the heat exchanger in the right location to make it easy to feed them as an inert gas over the solar aperture.

The heat exchanger is also well configured to allow the heated air to be directly fed to the burner.

Perhaps the biggest challenge for this configuration is the materials challenge for the air-exhaust heat exchanger. Note that the high temperature heat exchanger is designed to be co-flow to ensure maximum heating to the hottest part of the pipe.

In practice it may be necessary to cool the front end of the air-exhaust heat exchanger with heat transfer fluid to ensure that it stays sufficiently cool, especially in the solar-only mode.

It also avoids direct concentrated solar radiation from impinging on the burners.

The annular configuration, in which the air pre-heaters fully surround the inner chamber, is an advantage in reducing overall heat losses through the walls. As with all tower receivers, convective heat losses are higher than for ground-mounted devices due to the higher ambient air velocities and lower temperatures.

The advantages of the counter-flowing embodiment, shown in FIG. 10, over the co-flow embodiment of FIG. 3, are below:

It offers higher convective heat transfer to the tubes by the reversal in the direction of the flow of gases, to provide an additional pass of the gases past the back of the tubes.

Figure 11:
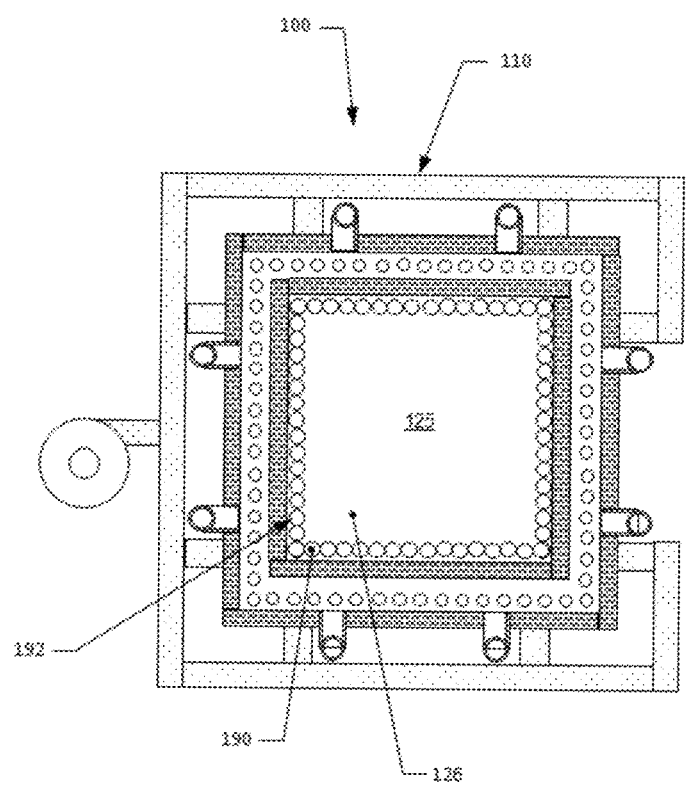
FIG. 11 is a diagrammatic cross-sectional view showing a hybrid receiver-combustor according to a second embodiment of the invention.

A third embodiment of the invention is shown in FIG. 11. The third embodiment is similar in some respects to the first embodiment and corresponding reference numerals are used to identify corresponding parts.

In particular, FIG. 11 shows the third embodiment of the hybrid receiver-combustor 100 according to the invention in a diagrammatic cross-sectional view. In this third embodiment, the cross-section of the hybrid receiver-combustor 100, and more particularly the cavity 125 and aperture 130, is generally square to match square mirrors typically used a heliostat field. Other cross-sectional configurations are possible, including a rectangular configuration.

Figure 12:
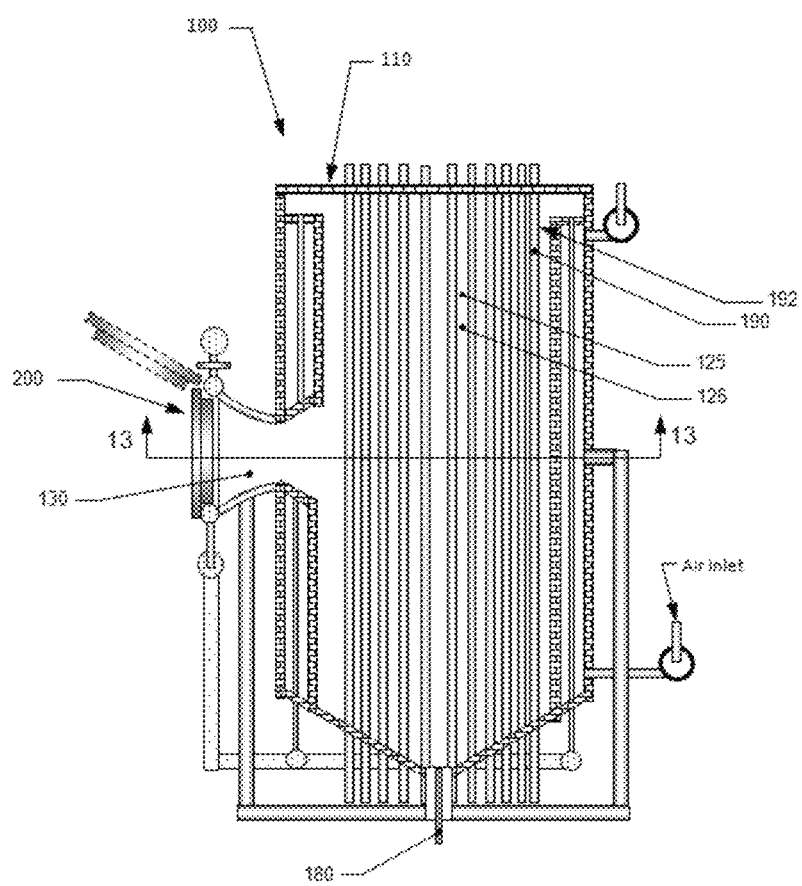
FIG. 12 is a diagrammatic sectional view showing a hybrid receiver-combustor according to a third embodiment of the invention.
Figure 13:
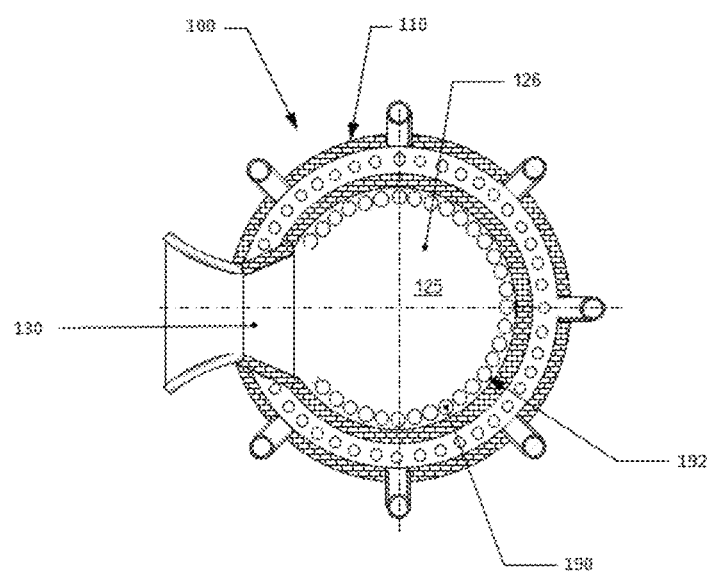
FIG. 13 is a diagrammatic cross-sectional view though line 13-13 of FIG. 12.

A fourth embodiment of the invention is shown in FIGS. 12 and 13. The fourth embodiment is similar in some respects to the first embodiment and corresponding reference numerals are used to identify corresponding parts.

In particular, FIGS. 12 and 13 shows the fourth embodiment of the hybrid receiver-combustor 100 according to the invention in a diagrammatic sectional view. In this fourth embodiment, the cross section of the hybrid receiver-combustor 100, and more particularly the cavity 125 and aperture 130, is generally square to match square mirrors typically used a heliostat field.

As best seen in FIG. 13, the cross-sectional configuration of this embodiment the hybrid receiver-combustor 100 is generally circular. Other cross-sectional configurations are possible, including a rectangular configuration which is likely to be advantageous.

In this fourth embodiment, the vessel 110 comprises a side section 194, a top section 195 and a bottom section 196. The aperture 130 is incorporated in the side section 195 and the burner 180 is incorporated in the bottom section 196, as shown in FIG. 12. With this arrangement, the burner 180 is arranged to fire generally transversely of solar radiation entering the cavity 125 through the aperture 130 through the aperture to thereby impinge upon the incoming solar radiation.

The fourth embodiment of the hybrid receiver-combustor 100 is oriented such that the aperture 130 faces the solar source and thereby the portion of the side section 194 which incorporates the aperture constitutes the front end of the hybrid receiver-combustor.

In the embodiments which have been described and illustrated, the heat energy absorber is configured as a heat-transfer fluid heat exchanger. Other arrangements are possible, as outlined below.

One such other arrangement involves application of the hybrid receiver-combustor for hybrid solar gasification, as already noted above. In such an arrangement, the heat exchanger comprising heat-transfer fluid in the tubes 192 would be replaced a heat energy absorber having provision for steam and pulverised carbonaceous particles. To achieve this will require high temperature materials for the heat energy absorber, such as silicon carbide, to allow gasification temperatures to be reached.

A fifth embodiment of the invention is directed to such an arrangement. The fifth embodiment is not shown as it essentially the same as the first embodiment, except that the heat-transfer medium comprises gasification reactants, typically being a mixture of steam and carbonaceous particles, but sometimes also including an additional carrier gas and/or an oxidant. In other words, the heat energy absorber comprises tubes within which the gasification reactants are heated. With this arrangement, the hybrid receiver-combustor is configured as a reactor. Carbonaceous feedstocks of either fossil or biomass origin can be heated in the presence of water at high temperature to generate "syngas", which is a blend of CO and $H_2$. The feedstock can be conveyed through the reactor as particles, transported by either a gaseous reactant, such as steam, by a gaseous product, such as "syngas", or by an inert gas, such as nitrogen. The use of an oxidant can also be incorporated to achieve some autothermal gasification to supplement the solar energy.

Such a reactor may also be configured as a chemical looping reactor to heat, for example, a Red-Ox chemical.

The hybrid receiver combustor 100 according to each of the embodiments described above is designed to be mounted at the focal point of any solar concentrator with a point focus. The two technology options for solar concentrating best suited to this task are the Solar Power Tower configuration, which employs a heliostat field of mirrors as described above with reference to FIG. 1, or the Parabolic Dish style of concentrator as described above with reference to FIG. 2. The mounting arrangement to house the hybrid receiver-combustor 100 at the focal point of a Power Tower 90 is illustrated in FIG. 1, while that used to mount it on a parabolic dish is illustrated in FIG. 2. The advantage of the Power Tower is that it allows the use of much larger individual receivers, which results in lower thermal losses and greater economies of scale for the hybrid receiver-combustor 100. The potential advantage of the Dish design is that mass production of dishes may be advantageous for some applications.

FIG. 1 also shows the system for the case in which a heat transfer fluid is circulated through the hybrid receiver-combustor 100 and used to generate steam via an Electricity Power Generating System, as is used for solar-only power tower systems. The heat-transfer fluid can be a thermal oil, a molten salt or any other suitable thermal fluid can be used. Alternatively the heat-transfer fluid can constitute a working fluid in the form of water for conversion to steam, a system that is termed direct steam generation. FIG. 1 also shows the case for which some thermal storage is provided with the system. This can be advantageous for some applications, but is not a necessary component of the system, so is illustrative only.

The hybrid receiver-combustor 100 according to the invention is robust, because it utilises the fluidic seal and thereby avoids the need for a window as known in the prior at for physically sealing the aperture during operation using the combustion process in conjunction with solar radiation. Windows are necessarily vulnerable, especially at larger scale. At the same time, this configuration allows gasification to be undertaken at high pressure, because tubes are capable of withstanding much greater pressure than windows.

The hybrid receiver-combustor 100 according to the invention avoids the need for oxygen in the gasification process, even during the combustion mode, since the gasification reactants are heated indirectly and are therefore not mixed with the combustion products. Hence the invention avoids the need for the air separation unit, which is expensive both in operating and capital costs. This provides a higher grade product than is possible with conventional auto-thermal gasification.

From the foregoing, it is evident that the present invention provides a highly effective arrangement for sealing the aperture during operation of the hybrid receiver-combustor using the combustion process in conjunction with solar radiation.

The fluidic seal need not necessarily completely eliminate all ingress of ambient air into the chamber or egress of combustion products from the chamber, but only need limit it sufficiently to maintain appropriate efficiency of the hybrid receiver-combustor. Ingress of cold air will reduce efficiency by lowering the flame temperature, due to partial substitution of hot combustion air with cold ambient air and will also lower it by leakage of hot gases from the chamber. However, if this leakage is sufficiently small, the effect of performance is likely to also be small.

The fluidic seal avoids the need for a window for physically sealing the aperture during operation using the combustion process in conjunction with solar radiation, as discussed above.

The absence of a window for physically sealing the aperture 130 during operation using the combustion process in conjunction with solar radiation is particularly advantageous, as it not only provides for a more robust construction of the hybrid receiver combustor 100, but also is conducive to a more compact, space-efficient arrangement as there is no need to accommodate an intrusive window construction. A compact, space-efficient arrangement is advantageous, particularly for applications where the hybrid receiver-combustor is required to be mounted in an elevated condition, such as on a tower as depicted schematically in FIG. 1, where size and weight can have a significant impact on cost.

Further, the fluidic seal enables the hybrid receiver-combustor 100 to be operable continuously for extended periods of time and to also be capable of mitigating against thermal shock arising from rapid variations in the intensity of available solar radiation.

It is a particular feature of the embodiments described and illustrated that heat from combustion within the cavity 125 is transferred to the same parts of the heat energy absorber 190 as heat from solar radiation entering the cavity. As discussed above, this is particularly advantageous as it facilitates mitigation of thermal shock arising from rapid variations in the intensity of available solar radiation. In particular, it facilitates compensation for variations in the intensity of available solar radiation through variations in the intensity of combustion process. In instances where solar radiation is plentiful, the hybrid receiver-combustor 100 may be operated using only heat energy received from concentrated solar radiation. In instances where solar radiation is unavailable (such as at night-time), the hybrid receiver-combustor may be operated using only heat energy from combustion within the chamber. In other instances, both heat energy from solar radiation and heat energy from combustion within the chamber may be used, with the heat energy in the chamber being controllable for managing the thermal output and thermal shock-loads. In particular, the heat energy in the zone is controlled so as to reduce thermal shock-loads that would otherwise be associated with rapid changes in solar radiation.

The control of the heat energy in the chamber can be achieved though selective control of the intensity of the flame and/or selective control of the intensity of solar radiation entering the chamber through the aperture.

It should be appreciated that the scope of the invention is not limited to the scope of the various embodiments described.

While the present invention has been described in terms of preferred embodiments in order to facilitate better understanding of the invention, it should be appreciated that various modifications can be made without departing from the principles of the invention. Therefore, the invention should be understood to include all such modifications within its scope.

Reference to positional descriptions, such as "upper", "lower", "top" and "bottom", are to be taken in context of the embodiments depicted in the drawings, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A hybrid receiver-combustor for capturing heat energy from a solar source and a fuel source, the hybrid receiver-combustor comprising:
   a chamber operable as a combustion zone for production of heat energy through a combustion process using the fuel source;
   the chamber having an aperture through which concentrated solar radiation is receivable;
   a fluidic seal system associated with the aperture, the fluidic seal system being operable to establish a fluidic seal for restricting fluid flow through the aperture during the combustion process; and
   a heat energy absorber for receiving heat energy from the concentrated solar radiation and also receiving heat energy from combustion within the chamber; the heat energy absorber comprises a heat energy transfer medium;
   wherein the heat energy absorber confronts the chamber and is disposed around the chamber, whereby the chamber provides a common zone relative to the heat energy absorber for receiving concentrated solar radiation and for production of heat energy through the combustion process; and
   wherein the heat energy absorber and the aperture cooperate to define a boundary of the chamber.

2. The hybrid receiver-combustor according to claim 1 operable to use captured heat energy to heat a heat-transfer fluid, the hybrid receiver-combustor further comprising:
   a heat exchanger for heating the heat-transfer fluid, the heat exchanger being associated with the chamber for receiving heat energy from the concentrated solar radiation and also receiving heat energy from combustion process within the common zone, wherein the heat energy absorber comprises the heat exchanger and wherein the heat energy transfer medium comprises the heat-transfer fluid.

3. The hybrid receiver-combustor according to claim 1 operable to use captured heat energy to heat a heat-transfer fluid, the hybrid receiver-combustor further comprising:
   a vessel useable both as a combustion furnace and as a solar receiver, the vessel including a casing defining a cavity providing said chamber;
   a burner for combusting an oxidant stream and fuel stream, the burner in fluid communication with the cavity for directing a flame into the cavity, the flame creating an exhaust gas; and
   a heat exchanger for heating the heat-transfer fluid, the heat exchanger being within the cavity, the heat energy absorber comprising the heat exchanger and the heat energy transfer medium comprising the heat-transfer fluid, whereby in use the heat-transfer fluid receives the heat energy from concentrated solar radiation and from the burner in ratios varying from 0:1 to 1:0 and the heat energy is controllable so as to reduce thermal shock-loads that would otherwise be associated with rapid changes in solar radiation.

4. The hybrid receiver-combustor according to claim 1 wherein the fluidic seal comprises exhaust gas from the combustion process.

5. The hybrid receiver-combustor of claim 4 wherein the fluidic seal comprises an exhaust gas curtain.

6. The hybrid receiver-combustor according to claim 4 further comprising an exhaust gas path for conveying exhaust gas from the combustion process to establish the fluidic seal, wherein the fluidic seal system comprises the exhaust gas path.

7. The hybrid receiver-combustor according to claim 4 further comprising at least one burner for combusting an oxidant stream and fuel stream, the burner being in fluid communication with the chamber for directing a flame into the chamber, the flame creating the exhaust gas.

8. The hybrid receiver-combustor according to claim 1 wherein the heat energy absorber comprises a heat energy transfer medium.

9. The hybrid receiver-combustor according to claim 8 wherein the heat energy absorber further comprises a heat exchanger associated with the chamber for receiving heat energy from the concentrated solar radiation and also receiving heat energy from combustion within the chamber and transferring the heat received to the heat energy absorber medium.

10. The hybrid receiver-combustor according to claim 8 wherein the heat energy transfer medium comprises a heat-transfer fluid.

11. The hybrid receiver-combustor according to claim 8 wherein the heat energy transfer medium comprises a working fluid.

\* \* \* \* \*